(12) United States Patent
Al-Azzawi

(10) Patent No.: US 7,724,458 B2
(45) Date of Patent: May 25, 2010

(54) HARD DISK DRIVE WITH SELECTABLE READING AND WRITING TO/FROM DIFFERENT PLATTER SURFACES

(76) Inventor: Jasim Saleh Al-Azzawi, 5501 Seminary Rd. # 2610, Falls Church, VA (US) 22041

( * ) Notice: Subject to any disclaimer, the term of this patent is extended or adjusted under 35 U.S.C. 154(b) by 569 days.

(21) Appl. No.: 10/913,435

(22) Filed: Aug. 9, 2004

(65) Prior Publication Data

US 2006/0028753 A1 Feb. 9, 2006

(51) Int. Cl.
*G11B 15/12* (2006.01)
*G11B 5/02* (2006.01)
(52) U.S. Cl. .................... 360/62; G9B/5.026
(58) Field of Classification Search .......... None
See application file for complete search history.

(56) References Cited

U.S. PATENT DOCUMENTS

| | | | | |
|---|---|---|---|---|
| 3,340,539 A | * | 9/1967 | Sims, Jr. .................. | 360/49 |
| 4,152,736 A | * | 5/1979 | Jansen et al. ............ | 360/78.04 |
| 4,354,209 A | * | 10/1982 | Sato et al. ................ | 360/61 |
| 4,414,590 A | * | 11/1983 | Merdian et al. .......... | 360/61 |
| 4,768,111 A | * | 8/1988 | Kranabetter .............. | 360/62 |
| 4,967,292 A | * | 10/1990 | Moteki ..................... | 360/61 |
| 5,373,402 A | * | 12/1994 | Price et al. ............... | 360/61 |
| 5,774,291 A | * | 6/1998 | Contreras et al. ......... | 360/67 |
| 6,272,533 B1 | * | 8/2001 | Browne .................... | 709/213 |
| 6,373,648 B2 | * | 4/2002 | O'Connor ................. | 360/63 |
| 6,594,101 B1 | * | 7/2003 | Iroaga et al. ............. | 360/67 |
| 7,003,674 B1 | * | 2/2006 | Hamlin ..................... | 713/193 |

FOREIGN PATENT DOCUMENTS

EP 1233344 A2 * 8/2002
JP 2001184148 A * 7/2001

* cited by examiner

*Primary Examiner*—Daniell L Negrón
(74) *Attorney, Agent, or Firm*—Moore Patents; David Dreyfuss

(57) ABSTRACT

This invention protects the data on the hard disk from viruses and hackers by making it possible to turn off any head whether it is a read head or a write head of any arm of the hard disk by providing switches, so when we surf the Internet we turn off the read/write heads of the platter surface which contains the confidential data and we always turn off the write head of the platter surface which contains the Windows programs and other program files so the programs data are always protected and at the same time it is always readable, after we logoff the Internet we turn off the read/write heads of the platter surface used to save Internet data onto it thus we will never have any virus moving from this platter surface to the rest of the hard disk platters surfaces.

6 Claims, No Drawings

HARD DISK DRIVE WITH SELECTABLE READING AND WRITING TO/FROM DIFFERENT PLATTER SURFACES

BACKGROUND OF THE INVENTION

This invention is in the field of computer hard disk where the primary parts of a typical hard disk drive consists of controller electronics designed to control the read/write mechanism and the motor that spins the platters.

The arm that holds the read/write heads is controlled by the mechanism in the upper-left corner, and is able to move the heads from the hub to the edge of the drive. To increase the storable amount of information on the drive most hard disks are provided with multiple platters. Some drives have three platters and six read/write heads.

Computer viruses spreading through the Internet have caused tremendous damage to individuals and corporations costing billions of dollars to remedy and overcome. This invention is designed to permanently solve the expanding virus problem by providing a final creative solution to a widening global problem. All known old, new and future viruses will become obsolete freeing computers worldwide from potential hackers and the damage they cause globally.

BRIEF SUMMARY OF THE INVENTION

In this invention we add an independent switch to every head of a hard drive. Thus, through this set of switches a computer user can absolutely control the protection of data stored on the hard disk against hackers and viruses. This goal is achieved by turning off any hard drive head, whether it is a read head or write head of any arm of the hard disk by the switches installed on the computer case or on the side of the laptop.

When a user logs on the Internet he turns on the read/write heads of the platter surface designated to save only the internet data. Therefore, if a virus is planted on this part of the hard disk no harm will take place and the virus will be confined to this part of the hard disk and remains permanently incapable of moving into any other part of the hard disk. At the same time we turn off the read/write heads of the platter surface, which contains the confidential data, so no virus can be planted on this part of the hard disk and no hacker can gain access to these confidential data. We always turn off the write head of the platter surface dedicated to hold Windows and other program files. As a result of the above three steps program data are always protected while being simultaneously readable. Since programs files are not confidential data so hackers gaining access to this part of the hard disk is harmless and since the write head is turned off no virus can be planted on this part of the hard disk. Consequently this part of the hard disk is always readable and completely protected.

After we logoff the internet we turn off the read/write heads of the platter surface used to save internet data thus totally preventing virus transfer from this platter surface to other platters. Next we turn on all other heads, except the write head of the platter surface which contains Windows and other programs.

BRIEF DESCRIPTION OF THE SEVERAL VIEWS OF THE DRAWINGS

There are no drawings.

DETAILED DESCRIPTION OF THE INVENTION

The hard disk stores data on the surfaces of the platters. Each platter has two arms, one for the upper surface and a second one for the lower surface, where each arm carries two heads one for reading and the other for writing and deleting.

The primary principle of this invention is to make a set of switches dedicated to control all read/write heads of the hard disc. These switches are fixed on the exterior of the computer case whereby each single head of the hard disk, whether it is a read head or write head, has an independent switch assigned to it only. This switch has two positions, it either turns off the head or turns it on. So the number of switches included in this set of switches equals the number of heads of the hard disk i.e. the hard disc will have an independent switch for each of its heads.

These set of switches turn off or on the read head and write head each separately and that may be accomplished in two ways. In the first way, the switches are connected through a wiring to the hard disc electronics circuitry, so that each switch will close or open some electronic gates resulting in turning on or off one of the heads assigned to it, either a read head or a write head. The second way of accomplishing the same goal is that we make the switch intercepts the line carrying data to the write head. So when the switch is turned off the line carrying data to the write head is cut off preventing all electronic signals from reaching the write head. Consequently no writing of new data can take place. And when the switch is turned on electronic signals will reach the write head enabling it to write the data on the platter surface and it will function normally.

As for the read head the switch interrupts the line carrying the data from the read head, so when the switch is turned off the line carrying data from the read head is cut off resulting in stopping the flow of electronic signals from the read head. As a result of this no reading of new data can take place. And when the switch is turned on it will read the data from the platter surface and electronic signals will flow from the read head and it will function normally. We could reduce the number of switches by making every switch controls one read/write head carried by one of the arms. So every switch controls totally one platter surface; controlling the data flow from the platter surface which is called reading and to the platter surface which is called writing.

Each switch has three positions. The first position turns on both the read head and the write head. The second position turns off the write head and keeps the read head turned on so only the read head is functioning. The third position will turn off both heads, the read head and the write head.

Therefore, if we have a hard disk with one platter it will have two switches, a hard disk with two platters will have four switches and a hard disk with three platters will have six switches, a switch for each read/write head i.e. we can control each surface area of each platter individually.

We may classify data saved on the hard disk into three categories. The first category is program files, such as windows. We will save these program files on the first platter or on the first surface of the first platter to be called from now on Programs Platter Surface. The second category is the confidential data where we will save it on the other platters surfaces and we will name it from now on the Confidential Data Platter Surface. The third category is the Internet data and the suspicious data. This data may contain viruses and we will save it on the final platter surface and we will name it the Internet Platter Surface.

When we have such a hard disk in our computer, initially we will switch on all the heads of all the platters surfaces, read/write heads in order to format the computer hard disk for the first time for the purpose of installing Windows and other programs on the first surface of the first platter. After that we will turn off the write head of the first arm belonging to the first surface of the first platter permanently and until such time we intend to install another program on this platter surface. At such time we turn on the write head by its assigned switch which is the first switch of the set of the switches fixed on the computer case or on the side of the laptop. So this write head will receive power and it start to writing the new program files on the surface of the platter. Upon completion of program installation we will turn off the write head and keep the read head turned on, thus ensuring permanently the absolute protection of data on this surface preventing data deletion or addition or the insertion of viruses to this platter surface which functions as readable only.

The confidential data should be saved on the other platters surfaces. Therefore, before a person logs in into the Internet he turns off these platters surfaces read/write heads to prevent viruses from gaining access to these surfaces and causing damage to these important data and preventing hackers from reading from these surfaces any confidential data giving individuals and corporation a sense of absolute security and confidence in the integrity of their data.

One of the platters or one of its surfaces can be assigned to the Internet data so that when a user wants to connect to the internet he should first turn off all the confidential Data Platter Surfaces read/write heads and turn on the read/write heads assigned to the Internet Platter Surface, preferably either the final surface or the final platter. By ensuring this combination all our confidential data are safe from the internet danger and all our program files are safe as only the read head is functioning. Through such combination we can surf the Internet, since we can save all desired data on the platter surface assigned for the internet files. Any potential virus will be saved only on this platter surface. Upon completion of Internet surfing we will turn off the read/write heads of the Internet Platter Surface and we restart the computer, thus if any potential virus is still lingering in the electronic memory of the computer it will be deleted.

After the computer finishes program loading we can work normally by turning on all the read/write heads of all the platters surfaces except the Internet Platter Surface read/write heads which should always be turned off and certainly the first platter surface, assigned to contain the program files, should always have the write head turned off. So through this invention our program files like windows are always protected against viruses and confidential data against hackers.

This invention will also protect the computer not only from the Internet viruses but also from all the other sources such as the floppy disk, CD, flash memory, infrared, LAN and other sources. We will assign a platter surface for suspicious data so when we want to save data on our computer and we are uncertain of its source and potentially harmful to our data we have to turn off all write heads of all the platters surfaces and keep the read heads turned on, except the write head of the platter surface assigned to suspicious data. We can use the same platter surface used for the Internet data to save suspicious data from the above mentioned sources.

We can reduce the number of switches by making every switch control two platter surfaces instead of one, so it turns on and off two read heads simultaneously as well as turning on and off two write heads simultaneously i.e. each switch controls one complete platter which means the two arms of this platter which also means the two read heads and the two write heads of these two arms.

We could further reduce the number of these switches by consolidating all switches into one single switch, called the Main Switch. This Main Switch will control all the heads of the hard disk. It will have three frequently used positions as well as a fourth position used very rarely. The fourth position keeps all the heads turned on and is used when formatting the hard disk. Due to the fact that this fourth position is rarely used and highly dangerous as viruses could easily move from one platter surface to another platter surface a leaver will be used to lock this position and only by shifting this lever the fourth position may be used.

The first position of the main switch is used for every day work. The first position turns off the write head of the programs platter surface as well as turning off the read/write heads of the Internet Platter Surface while at this first position the read head of the programs platter surface is kept turned on and the read/write heads of the Confidential Data Platter Surfaces turned on. The second position is used while surfing the Internet or downloading suspicious data from CD's, floppy disks or other sources. In this position the write head of the Programs Platter Surface is turned off and the read/write heads of the Confidential Data Platter Surfaces are turned off too while keeping the read head of the programs platter surface turned on as well as the read/write heads of the Internet Platter Surface.

The third position is when we want to download a new program onto the hard disk on the Programs Platter Surface. This position turns off only the read/write heads of the Internet Platter Surface while all the read/write heads of all the other platters surfaces are turned on and that way we can install any new program like MS Office, PhotoShop or any other program and upon completion of program installation we shift the main switch to the first position for every day normal work.

In a nutshell the first position on the Main Switch is for every day normal work, second position is while installing a new program on the Programs Platter Surface, the third position is while surfing the Internet or downloading suspicious data from CD's, floppy disks or other sources, and the fourth position, which is protected by a leaver, is used when formatting the computer for the first time.

The above-described switch positions are summarized in Table 1:

TABLE 1

| Multi-pole Switch Position | Program Platter | Confidential Data Platter | Internet Platter |
| --- | --- | --- | --- |
| 1 | read on, write off | read on, write on | read off, write off |
| 2 | read on, write off | read off, write off | read on, write on |
| 3 | read on, write on | read on, write on | read off, write off |
| 4 | read on, write on | read on, write on | read on, write on |

The Main Switch can be fixed on the side of the laptop or on the front of the computer desk case and the user may choose any of the four positions of the Main Switch as desired.

Instead of switches software can be used to turn on and off hard disk heads, whether they are a read heads or a write heads i.e. all hard disk heads can be controlled by this software. Upon clicking the software icon on the taskbar a table showing each head with a relevant tab in front of it will appear on the screen. By clicking the desired tab we can turn on or off a specific head per our need. By using this table we can decide which head to turn on and off. Furthermore, other tabs can turn on or off a combination of heads per user's need. While we may add many other extra tabs, personally I prefer to have only four tabs. The first tab is used for normal daily work where it turns off the write head of the Programs Platter Surface and at the same time it turns off the read/write heads of the Internet Platter Surface while the rest of the heads are kept turned on. The second tab is used when we want to surf the Internet whereby it turns off the read/write heads of the Confidential Data Platter Surface as well as the write head of the Program Platter Surface and it turns on the read/write heads of Internet Platter Surface. The third tab is used to download new programs onto the hard disk. This tab turns on the write head of the Programs Platter Surface and all the other read/write heads of all the arms except the read/write heads of Internet Platter Surface which will be turned off. The forth tab turns on all the read/write heads of all the platters surfaces and is used when we want to format the hard disk and make partitions on the hard disk. Through these tabs the user has the option to use a single or a combination of tabs to control the hard disk read/write heads.

Although the software option seams cheaper but may not be 100% safer in comparison with the hardware switches option, as determined hackers eventually may design a specific virus capable of overwhelming and breaking through this software. As hard disks contains extremely valuable and confidential data the majority of users, especially big corporation with high value data, will prefer to use a hard disk with switches than a hard disk with software since switches are extraordinarily safe.

The present Windows program saves automatically the My Documents folder on the same platter surface that the Windows programs are saved on, but since in this invention the write head of the Programs Platter Surface is turned off we will not be able to save the data in My Documents folder so we should ignore this folder at the present time until Microsoft produces a new Windows program compatible with this new antivirus hard disk where the new Windows program will have the My Documents folder on a different platter surface.

The best mode for carrying out this invention is a hard disk having a main switch that controls all the heads of the hard disk. This switch will have three frequently used positions and a rarely used fourth position protected by a lever.

The industrial applicability of this invention will be tremendous as computer hard disk manufacturers will be extremely enthusiastic to produce this new kind of hard disks due to the profit and market share generated as a result of market interest in the protection of valuable data.

The invention claimed is:

1. A single hard disk drive for a computer comprising:
   at least one platter, each platter comprising two surfaces;
   arms associated with each surface, wherein each arm carries two heads, a read head and a write head;
   a set of one or more switches mounted on the exterior of the case of said computer capable of selectively turning off one or more of said read and/or write heads,
   wherein said set of switches can be configured so that at least one read and/or write head is turned on and at least one read and/or write head for a different platter surface is turned off.

2. The hard disk drive of claim 1, wherein said set of switches comprises an independent switch for each of said read heads and said write heads.

3. The hard disk drive of claim 1, wherein each switch of said set of switches controls electronic gates which turn on and off one or more of said read and/or write heads.

4. The hard disk drive of claim 1, wherein each switch of said set of switches intercepts the line carrying data to one or more of said read and/or write heads.

5. The hard disk drive of claim 1, wherein each switch has three positions, wherein position 1 turns on both a read head and a write head for one surface of a platter, position 2 turns off said write head but keeps said read head turned on, and position 3 turns off both said read head and said write head.

6. The hard disk drive of claim 1, further comprising a program platter, a confidential data platter, and an internet platter;
   wherein said set of switches comprises a single multi-pole switch with four positions;
   wherein the read and write heads for said program platter, said confidential data platter, and said internet platter are turned on or off according to Table 1 the following table:

TABLE 1

| Multi-pole Switch Position | Program Platter | Confidential Data Platter | Internet Platter |
| --- | --- | --- | --- |
| 1 | read on, write off | read on, write on | read off, write off |
| 2 | read on, write off | read off, write off | read on, write on |
| 3 | read on, write on | read on, write on | read off, write off |
| 4 | read on, write on | read on, write on | read on, write on |

* * * * *